(12) United States Patent
Lürkens

(10) Patent No.: US 6,370,045 B1
(45) Date of Patent: Apr. 9, 2002

(54) CONVERTER INCLUDING A FLY-BACK CIRCUIT

(75) Inventor: Peter Lürkens, Aachen (DE)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/656,129

(22) Filed: Sep. 6, 2000

(30) Foreign Application Priority Data

Sep. 8, 1999 (DE) .......................... 199 42 794

(51) Int. Cl.[7] .............................. H02M 3/335
(52) U.S. Cl. ................ 363/21.12; 363/142; 323/299
(58) Field of Search ................... 363/21.12, 21.18, 363/123, 124, 142; 323/222, 299, 301, 303

(56) References Cited

U.S. PATENT DOCUMENTS

| | | | |
|---|---|---|---|
| 4,683,529 A | 7/1987 | Bucher, II | 363/44 |
| 5,764,495 A * | 6/1998 | Faulk | 323/303 X |
| 5,894,243 A * | 4/1999 | Hwang | 323/299 X |

FOREIGN PATENT DOCUMENTS

JP  10257402 A  9/1998  ........... H04N/5/44

* cited by examiner

Primary Examiner—Jessica Han

(57) ABSTRACT

The invention relates to a converter including a fly-back circuit (5). For obtaining a maximum possible adaptation to the internationally different network voltages, there is proposed to provide a first fly-back frequency range for a converter input voltage ($U_{net}$) lying in a first voltage range and a second fly-back switching frequency range for a converter input voltage ($U_{net}$) lying in a second voltage range, the first voltage range having smaller voltage values than the second voltage range and the first fly-back switching frequency range having larger frequency values than the second fly-back switching frequency range.

20 Claims, 4 Drawing Sheets

CONVERTER INCLUDING A FLY-BACK CIRCUIT

BACKGROUND OF THE INVENTION

This invention relates to a converter including a fly-back circuit.

The converter according to the invention is preferably used as a part of a switching power supply in entertainment electronics devices.

U.S. Pat. No. 4,683,529 describes a switching power supply including a fly-back circuit and a control circuit for power factor correction. The switching power supply converts a line voltage into a regulated DC output voltage and is adapted for operation with different line voltages and line voltage frequencies which vary internationally. The control circuit controls the switching transistor of the fly-back circuit by means of a pulse width modulated control signal having a suitable frequency, so that the fly-back circuit operates on the borderline between continuous and discontinuous operation to minimize the switching losses. Furthermore, the switching power supply provides a high power factor under various mains and load conditions.

SUMMARY OF THE INVENTION

It is an object of the invention to provide a converter including a fly-back circuit (i.e. high frequency boost converter) arranged so that an optimum adaptation to the internationally different line voltages is achieved.

This object is achieved in that with a converter input voltage that lies in a first voltage range a first fly-back switching frequency range is provided and in that with a converter input voltage lying in a second voltage range a second fly-back switching frequency range is provided, the first voltage range having lower voltage values than the second voltage range and the first fly-back switching frequency range having higher frequency values than the second fly-back switching frequency range.

In this way the internationally different EMI requirements (Electro Magnetic Interference) in Europe and the USA for entertainment electronics devices are satisfied by a respectively adapted selection of the fly-back switching frequency ranges. This arrangement leads to switching power supplies that have small dimensions and little weight.

The inventive idea is more particularly realized in that the converter operates discontinuously in the second voltage range and in that approximately the same top limit for the current is provided by the fly-back inductance both during operation in the first voltage range and during operation in the second voltage range. More particularly, the converter operates in the boundary region between continuous and discontinuous operation in the first voltage range and under full load, whereas the converter operates discontinuously in the first voltage range and under partial load, and the converter operates discontinuously in the second voltage range both under fall load and under partial load.

In another embodiment of the converter according to the invention a first capacitor supplies the supply voltage of an integrated switching circuit which is used for supplying the control signal for the fly-back switching element and the first capacitor is coupled to a node between the fly-back inductance, fly-back switching element and fly-back diode via a second capacitor and a further diode via which the first capacitor is charged in the manner of a charge pump. This measure guarantees the voltage supply of the integrated circuit via simple circuit modifications.

In another circuit variant a circuit block is connected to the node between the fly-back inductance, the fly-back switching element and the fly-back diode and produces a signal for the recognition of the zero state of the current through the fly-back diode and/or the state of the minimum voltage on the switch. The signal thus supplied can be used for determining the optimum instant for turning on the fly-back switching element, so that the switching losses are minimized.

The transition from the first to the second operating mode (i.e. first voltage range to second voltage range) is preferably effected continuously.

Examples of embodiment of the invention will be further described hereinafter with reference to the drawings in which.

DETAILED DESCRIPTION OF THE PREFERRED EMBODIMENT

Figure 1:
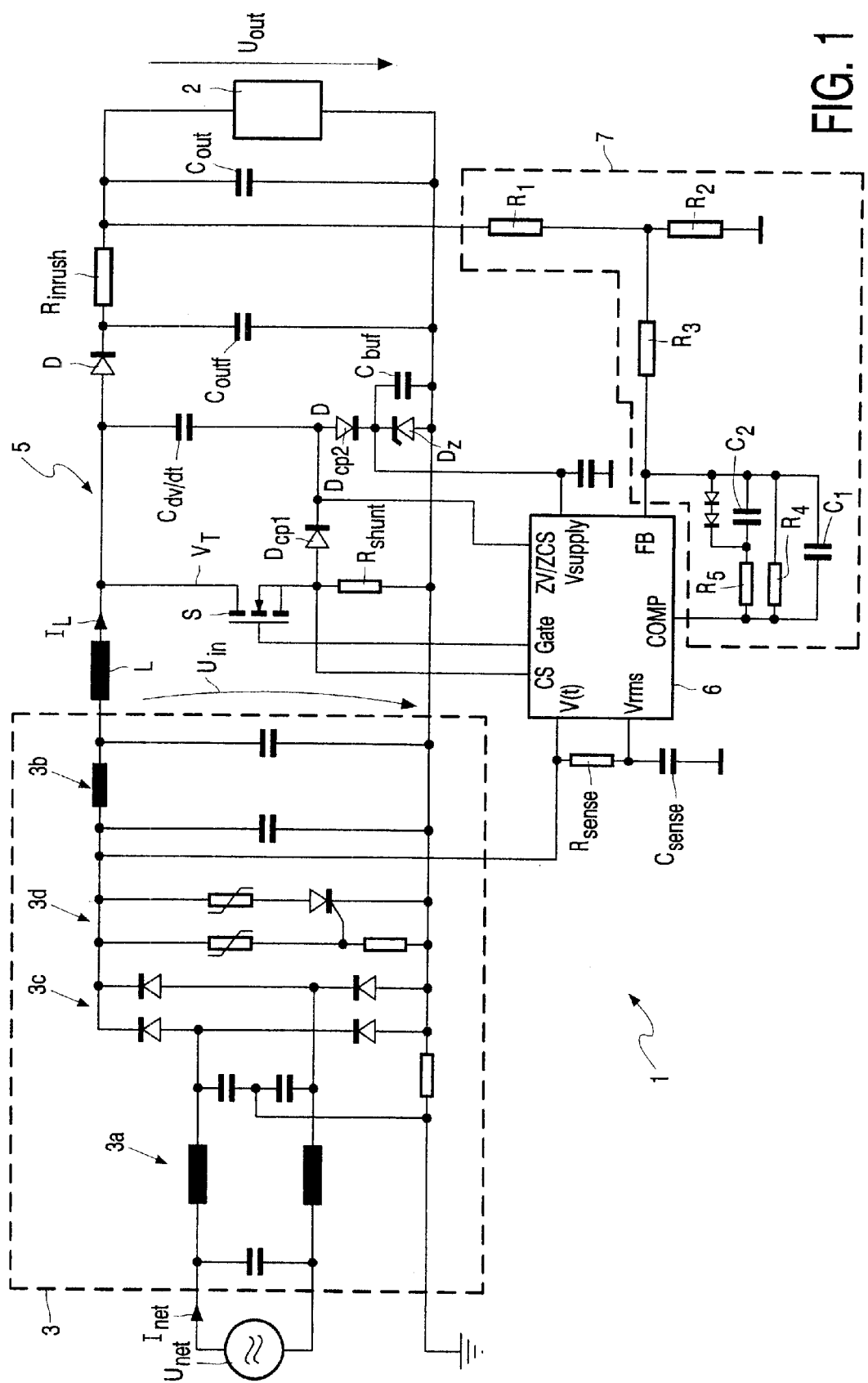
FIG. 1 shows a converter according to the invention.

In the (AC/DC) converter 1 shown in FIG. 1, a line voltage $U_{net}$ is converted into an output voltage $U_{out}$, which is used for supplying power to a load 2. The line voltage $U_{net}$ is first applied to a circuit block 3 operative as an input stage, which includes filter circuits 3a and 3b, a rectifier arrangement 3c and a voltage limiting circuit 3d. On the output of the input stage 3a rectified voltage $U_{in}$, which in good approximation can be described as a sequence of positive sine half-waves, is produced while the converter 1 is in operation. The voltage $U_{in}$ is supplied to a fly-back circuit 5 which normally comprises an inductance L, a switch/switching element S (arranged here as a MOSFET transistor) and a diode D. The current flowing through the inductance L is referenced $I_L$. The control input of the switch S, i.e. the gate electrode of the MOSFET transistor used as a switch, is connected to a respective output referenced Gate of a control unit 6. The operation of the control unit 6 will be discussed in more detail hereinafter with reference to FIG. 2.

In parallel with the output of the fly-back circuit 5 is connected a capacitor $C_{outf}$ one terminal of which is coupled to a terminal of the output capacitor $C_{out}$ via a resistor $R_{inrush}$. The resistor $R_{inrush}$ is used for limiting the current derived by the converter from the mains supplying the voltage $U_{net}$. This is accompanied by fewer losses than with customary current limitation by means of an NTC resistor connected on the input side of the converter 1. The other two terminals of the capacitors $C_{outf}$ and $C_{out}$ are both connected to zero potential (ground potential). At the capacitor $C_{outf}$ the output voltage $U_{out}$ is tapped. The capacitor $C_{out}$ is used for reducing the ripple of the DC output voltage $U_{out}$ and for deriving the high-frequency portions of the output current of the up-converter and thus for further reducing the losses in the resistor $R_{inrush}$.

A voltage V(t) applied between the voltage limiter 3d and the filter circuit 3b (which applied voltage V(t) filtered by the filter circuit 3b provides the voltage $U_{in}$) is applied to a respective input of the control unit 6. For the case where the filter circuit 3b is lacking, which circuit is not absolutely necessary within the framework of the invention, the voltage $U_{in}$ would be applied to the input V(t) of the control unit 6. The voltage V(t) is further applied to a series combination comprising a resistor $R_{sense}$ and a capacitor $C_{sense}$, which is used for generating a voltage $V_{rms}$ from the voltage V(t). This voltage corresponds to the mean value of the rectified line voltage and furthermore represents a good approximation of a parameter for the effective value of the input voltage. The voltage value $V_{rms}$ corresponding to this effective value is tapped from the capacitor $C_{sense}$ and applied to the input referenced $V_{rms}$ of the control unit 6.

A resistor $R_{shunt}$ is used for measuring the current flowing through the switch S. A voltage having a voltage drop at this resistor $R_{shunt}$ is applied to an input CS of the control unit 6 as a measuring quantity that corresponds to the current flowing through the switch S.

An input ZV/ZCS of the control unit 6 is used for receiving a signal by the aid of which a ZVS mode (Zero Voltage Switching, turning the switch S on with zero voltage or at least the smallest possible voltage) or ZCS mode (Zero Current Switching, turning the switch S on with a zero current in the diode D) is reached. The terminal ZV/ZCS is connected both to the terminal of the capacitor $C_{dv/dt}$ lying across from the node between the inductance and the diode D, and from the cathode of the diode $D_{cp1}$, the anode of the diode $D_{cp1}$ being connected to the node between the switch S and the resistor $R_{shunt}$, which node is connected to the terminal CS.

The cathode of the diode $D_{cp1}$ is further connected to the anode of a diode $D_{cp2}$ whose cathode is connected to the cathode of a zener diode $D_z$, whose anode again is connected to zero potential. In parallel with the zener diode $D_z$ is further connected a capacitor $C_{buf}$. The voltage $V_{supply}$ is used as the supply voltage for the control unit 6 and is applied to an accordingly referenced input of the control unit 6.

Two terminals FB and COMP of the control unit 6 are coupled to a circuit block 7 (see FIG. 1) which evaluates the output voltage $U_{out}$. This circuit block contains two resistors $R_1$ and $R_2$ arranged as a voltage divider, on which the output voltage $U_{out}$ is present. The node between the resistors $R_1$ and $R_2$ is connected via the resistor $R_3$ to the terminal FB (FeedBack input) of the control unit 6. The terminal FB is further coupled to the terminal COMP via a parallel circuit comprising three branches, one of the parallel branches including a capacitor $C_1$, another branch including a resistor $R_4$ and the third branch including a series combination of a resistor $R_5$ and a capacitor $C_2$. Furthermore, two diodes not further referenced which have a forward direction in the direction of the terminal COMP are connected in parallel with the capacitor $C_2$. The circuit block 7 determines the control behavior of the control unit 6. More particularly, the components combined by the circuit block 7 are dimensioned so that the control unit 6 shows the behavior of a PI controller with limited DC voltage gain.

Figure 2:
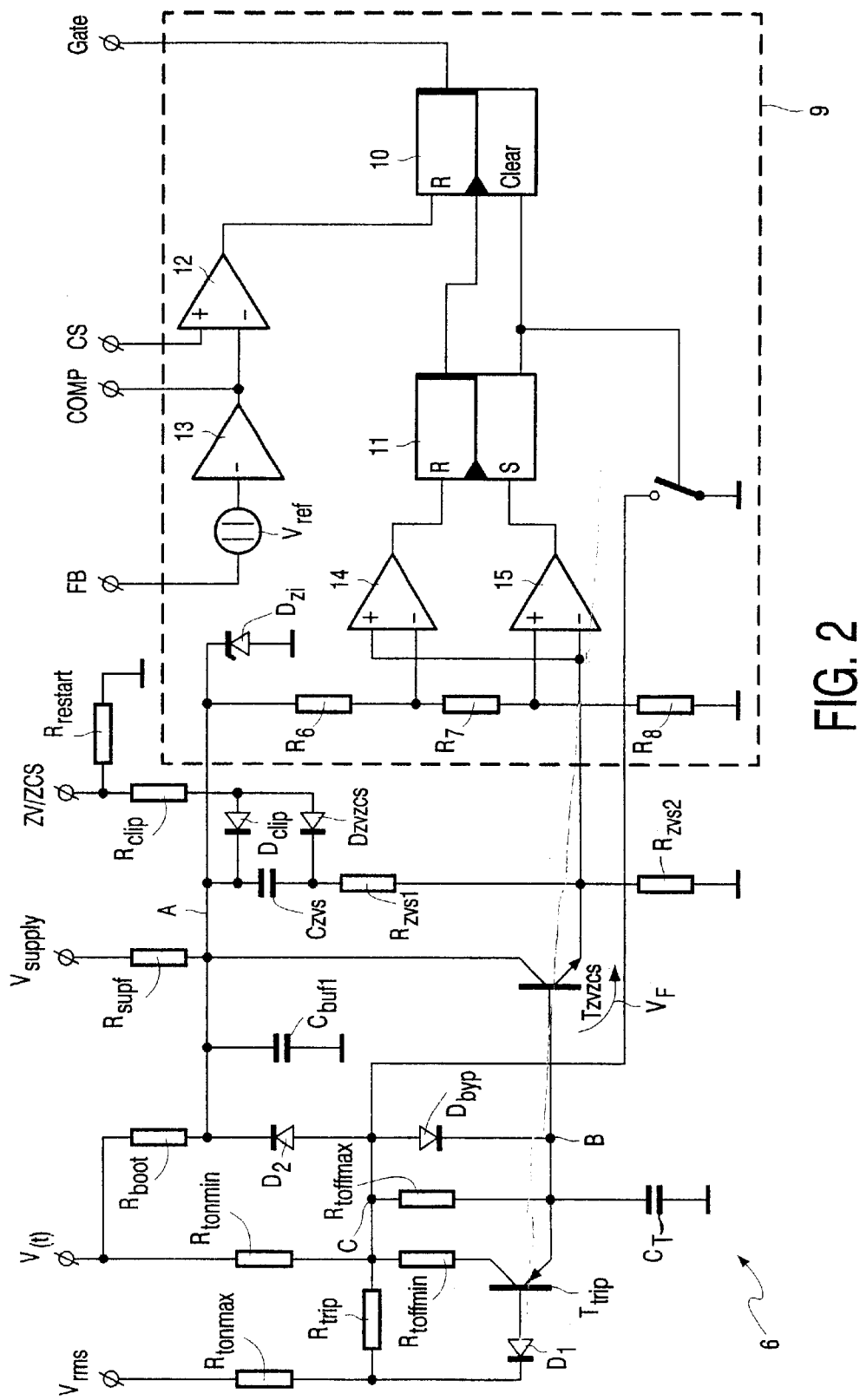
FIG. 2 shows a control unit for the converter according to the invention.

FIG. 2 shows the structure of the control unit 6 by which circuit portions combined in a block 9 are realized by means of a commercially available controller IC (UCC3807). A flipflop 10 delivers a control signal applied to a terminal referenced Gate and to the control input of the switch S. The flipflop 10 is triggered by a further flipflop 11. The RESET input of the flipflop 10 is connected to the output of a comparator 12 whose one input (+) is connected to a terminal CS and whose other input (−) is connected to the output of an error amplifier 13 and the terminal COMP. A voltage superimposed by a reference voltage Vref and present on a terminal FB is applied to the input of the amplifier 13. As soon as the voltage value present on the terminal CS, which value—as stated above—is equivalent to the current flowing through the switch S, exceeds the voltage value present on the terminal COMP or on the output of the amplifier 13 respectively, the flipflop 10 is reset and a respective turn-off signal is applied to the switch S via the terminal Gate.

On the inputs of the flipflop 11 are present the output signals of two comparators 14 and 15 i.e. on the reset input the output signal of the comparator 14, on the set input the output signal of the comparator 15. The positive input of the comparator 14 is connected to the negative input of the comparator 15. The two other comparator inputs are coupled to a series combination of three resistors $R_6$, $R_7$ and $R_8$ which combination is connected on one side via a terminal of the resistor $R_8$ to ground potential and on the other side via a terminal of the resistor $R_6$ to a terminal of a resistor $R_{supf}$, whose other terminal is connected to the supply voltage terminal $V_{supply}$ of the control unit 6. The node between $R_6$ and $R_{supf}$ is referenced A. A zener diode $D_{zi}$ connects the node A to ground potential. Between the two resistors $R_6$ and $R_8$ lies the resistor $R_7$. The node between the resistors $R_6$ and $R_7$ is connected to the negative input of the comparator 14. The node between the resistors $R_7$ and $R_8$ is connected to the positive input of the comparator 15.

The terminal ZV/ZCS is coupled via a resistor $R_{restart}$ to ground potential. Furthermore, between the terminal ZV/ZCS and the node A lies the series arrangement of a resistor $R_{clip}$ and a diode $D_{clip}$ whose cathode is connected to the node A. The anode of the diode $D_{clip}$ is connected to the anode of a diode $D_{ZVCCS}$, whose cathode is connected to a terminal of a resistor $R_{ZVS1}$. Between the cathodes of the diodes $D_{clip}$ and $D_{ZVZCS}$ is arranged a capacitor $C_{ZVS}$. Furthermore, between the other terminal of the resistor $R_{ZVS1}$ and ground potential there is a resistor $R_{ZVS2}$.

The node between the two resistors $R_{ZVS1}$ and $R_{ZVS2}$ is connected, on the one hand, to the negative input of the comparator 15 and, on the other hand, to the emitter of an npn bipolar transistor $T_{ZVZCS}$. A collector of the transistor $T_{ZVZCS}$ is connected to the potential of the node A. The base of this transistor (node B) is connected to a terminal of a capacitor $C_T$ whose other terminal is connected to ground potential. Between a node C and the node B lies in forward direction from node C to node B a diode $D_{byp}$ and in parallel with this diode $D_{byp}$ a resistor $R_{toffmax}$. Furthermore, the node C is connected to a resistor $R_{toffmin}$, whose other terminal is connected to the collector of a pnp bipolar transistor $T_{trip}$. The emitter of the transistor $T_{trip}$ is connected to the node B.

The base of the transistor $T_{trip}$ is connected to the anode of the diode $D_1$. The cathode of the diode $D_1$ is connected to a terminal of a resistor $R_{tonmax}$, whose other terminal is connected to the terminal $V_{rms}$. Between the cathode of the diode $D_1$ and the node C lies a resistor $R_{tip}$. Between the node C and the terminal V(t) lies a resistor $R_{tonmin}$. The terminal V(t) is further connected to one terminal of a resistor $R_{boop}$ whose other terminal is connected, on the one hand, to the cathode of a diode $D_2$ and, on the other, to one terminal of a capacitor $C_{buf1}$. The other terminal of the capacitor $C_{buf1}$ is connected to ground potential. The anode of the diode $D_2$ is connected to the node C.

By means of the control unit 6 the time durations $t_{onmax}$ and $t_{offmin}$ (see FIGS. 3 to 6) are automatically set to suitable values. The values are determined by a suitable selection of the capacitor $C_T$, the resistor $R_{tonmax}$, the resistor $R_{tonmin}$, the resistor $R_{toffmax}$ and the resistor $R_{toffmin}$. By means of the transistor $T_{ZVZCS}$ the capacitor $C_T$ is decoupled from the circuit portions $D_{ZVCS}$, $R_{ZVS1}$ and $R_{ZVS2}$ which effect the ZVS and ZCS behavior.

In the turned-on state of the switch S, the flipflop 10 applies to the terminal Gate a control signal which has a high signal level for turning the switch S on. The flipflop 10 is then accordingly triggered by the flipflop 11. At the beginning of such a phase the voltage on capacitor $C_T$ is about one third of the supply voltage $V_{supply}$ plus the forward voltage $V_F$ which drops at the base-emitter path of the transistor $T_{ZVZCS}$. At the terminal Gate there is a turn-on signal until the voltage on the capacitor $C_T$ exceeds the upper trigger level i.e. the threshold having magnitude $\frac{2}{3}V_{supply}+V_F$. The turn-on signal is switched off when the current in the resistor $R_{shunt}$ and thus the voltage on the terminal CS of the control unit 6 exceeds a value that is determined by the voltage on the terminal COMP of the control unit. The rise of the voltage on the capacitor $C_T$ is then determined by the magnitude of the voltages $V_{rms}$ and $V(t)$. The time constant belonging to this charging process is determined by $R_{tonmax}$, $R_{trip}$ and $R_{tonmin}$. During the charging of the capacitor $C_T$, the resistors $R_{toffmin}$ and $R_{toffmax}$ are shunted by the diode $D_{byp}$ and accordingly have no influence on this charging process. Furthermore, during the charging of $C_T$, the diode $D_{byp}$ has the object to prevent the transistor $T_{tip}$ experiencing a positive collector-emitter voltage and prevent the node C being set to the supply voltage via the anti-latch-up diode $D_2$. In this case the time interval $t_{onmax}$ (compare the explanations of FIGS. 3 to 5) would no longer be a function of the voltages $V_{rms}$ and $V(t)$. The terminal between $t_{onmax}$, $V(t)$ and $V_{rms}$ may roughly be approximated by the formula $$t_{onmax} \cong \frac{k_1}{k_2 V(t) + V_{rms}}$$

with $k_1$ and $k_2$ as constants. The time interval $t_{onmax}$ calculated from a respective start of a switching cycle (at which the switch S is turned on) is the maximum time during which the switch S can be turned on. The switch S is turned off already when the current flowing through the switch S exceeds a certain limit value i.e. when the voltage decreasing on resistor $R_{shunt}$ and present on the input CS of the control unit 6 becomes greater than the voltage present on the input COMP of the control unit 6. In this manner, the transmitted power of the converter is regulated. The fact that the time period $t_{onmax}$ depends both on the time-independent magnitude $V_{rms}$ and on the time-dependent magnitude $V(t)$ according to the above-defined function, limits, on the one hand, the smallest possible switching frequency of the switch S and, on the other hand, causes a more trapezoidal pattern of the current $I_{net}$ to occur, which leads to a smaller part of low-frequency harmonics present in the current drawn from the converter.

After the said upper trigger level has been exceeded, the capacitor $C_T$ is discharged via the resistors $R_{toffmin}$ and $R_{toffmax}$ and a switch of the control unit 6 which is not further referenced. During the discharge operation, the voltage on capacitor $C_T$ drops from $\frac{2}{3}V_{DD}+V_F$ to $\frac{1}{3}V_{DD}+V_F$. As long as the voltage on capacitor $C_T$ lies more than 233 $V_F$ above the value on the anode of $D_1$ (trip level), the transistor $T_{trip}$ is conductive, so that the parallel circuit of the resistors $R_{toffmin}$ and $R_{toffmax}$ is active with respect to the discharging of $C_T$. If the converter works in the mains voltage range of 220 V, the voltage on the anode of $D_1$ during the discharging of $C_T$ lies above $\frac{2}{3}V_{supply}+2\times V_F$. This is understood to mean that the transistor $T_{trip}$ is never turned on and the discharge time of $C_T$ is only determined by $R_{toffmax}$.

With mains input voltages in the range of 110 V, the voltage on the anode lies below $\frac{1}{3}V_{supply}+2\times V_F$. In this case $T_{trip}$ is turned on during the whole discharging phase which takes place between $\frac{1}{3}V_{supply}+V_F$ and $\frac{2}{3}V_{supply}+V_F$.

Figure 6:
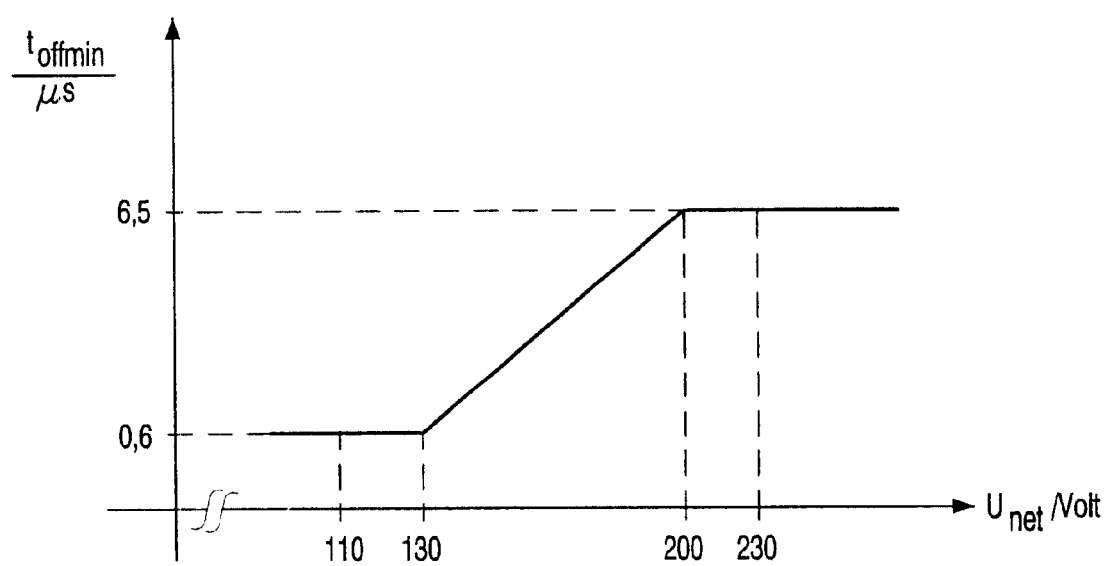
FIG. 6 shows a diagram which shows the connection between the minimum turn-off time and the converter input voltage.

The maximum possible switching frequency with which the switch S is operated depends, on the one hand, on the time period $t_{onmax}$ and, on the other hand, on the time period $t_{offmin}$. The former time period depends on the time-dependent voltage $V(t)$ and thus the instantaneous value of the converter input voltage $U_{net}$. $t_{offmin}$ is not time-dependent and depends only on the voltage $V_{rms}$ and thus on the voltage amplitude or effective value respectively, of the input voltage $U_{net}$ (but not on its instantaneous value). Accordingly, the range in which the switching frequency of the switch S lies while a predefined converter input voltage is $U_{net}$, only depends on $V_{rms}$. FIG. 6 shows the connection between $U_{net}$ and $t_{offmin}$ and clarifies that $t_{offmin}$ in a first range of rather small converter input voltages $U_{net}$ with voltage amplitudes around 110 Volts (in the present example having an upper range limit of 130 volts) is set to a small value of $t_{offmin}$ (here 0.6 μs), so that the converter operates in a first switching frequency range with accordingly high frequencies. On the other hand, $t_{offmin}$ in a second range of rather large converter input voltages $U_{net}$ having voltage amplitudes around 230 Volts (in the present example having a lower range limit of 200 volts) is set to a large value of $t_{offmin}$ (here 6.5 μs), so that the converter operates in a second switching frequency range with low switching frequencies.

The minimum switching frequency is reached with $V(t)=0$ and thus with a maximum value of $t_{onmax}$, which is proportional to $1/V_{rms}$. The maximum switching frequency appears with the maximum value of $V(t)$ and thus a minimum value of $t_{onmax}$. Therefore, with the converter according to the invention, the switching frequency range (i.e. upper and lower switching frequency limit) is shifted to lower frequencies when the value of $V_{rms}$ rises and to higher frequencies when the value of $V_{rms}$ drops. With the converter according to the invention it is possible to automatically adapt the switching frequency range, so that different EMI conditions, such as, more particularly used in entertainment electronics devices in Europe and the USA are satisfied. For example, the converter according to the invention can be dimensioned so that with a line voltage in the region of 230 volts, which is customary in Europe, it is set to switching frequencies below 140 kHz (in accordance with the EMI regulations there) and with a line voltage in the area of 110 volts, which is customary in the USA, it is set to high switching frequencies in the area of 300 kHz (in the USA such high switching frequencies are permitted on the basis of different EMI regulations). The converter structure according to the invention then leads to smaller converter losses. The converter efficiency is increased over a wide input or line voltage range and the converter can be realized with a smaller weight and smaller shape.

ZS, ZVS, valley switching and power supply of the control unit 6:

To guarantee operation of the converter 1 with a highest possible degree of efficiency, the switch S is not to be turned on until the current flowing through the diode D has dropped to zero. Different from the customary realization of such a ZCS operation, and optionally also of a ZVS operation, i.e. different from changing over the switch S in the case of a switching voltage of (substantially) zero volts, a charge pump is used in the present converter, which pump is simultaneously used for supplying power to the controller ICs used for the control unit 6 (see below) and providing the gate charge of the switching transistor S.

After the switching transistor S has been turned off, the voltage $V_T$ on its drain terminal rises sharply. The load current of the switching transistor S shifts to the capacitor $C_{dv/dt}$. The current flowing through the capacitor $C_{dv/dt}$ flows through the diode $D_{cp2}$ to the capacitor $C_{buf}$—in accordance with the function of a charge pump. An overcharging of the capacitor $C_{buf}$ is avoided by the zener diode $D_z$. The voltage of the capacitor $C_{buf}$ is used as a supply voltage $V_{supply}$ for the control unit 6. Normally, the voltage on the capacitor $C_{buf}$ is never considerably smaller than the usual supply voltage of the control unit 6. The voltage on node D thus has about the value of the supply voltage exclusive of the voltage drop on the diode $D_{cp1}$.

By means of a filter arranged inside the control unit 6, which filter comprises the resistor $R_{supf}$ and the capacitor $C_{buf1}$, the voltage $V_{supply}$ is additionally filtered.

If the voltage on the capacitor $C_{dv/dt}$ has reached the level of the output voltage, the diode D becomes conductive. At that moment the current shifts from the diode $D_{cp2}$, $C_{buf}$ or $D_z$ respectively, to the diode D. The voltage on node D now slowly drops with the comparatively long time constant which is determined by capacitor $C_{dv/dt}$ and the resistor $R_{restart}$ of the control unit 6 (FIG. 2). When the converter operates in a normal way, this does not have any effect on the manner of functioning. The current in the coil L now drops linearly because the output voltage of the converter, when operated according to its use, is always larger than the instantaneous value of the input voltage.

The diode D blocks when the current flowing through it has become zero. At that moment an oscillating process begins in the oscillation circuit comprising L and $C_{dv/dt}$. The capacitor $C_{dv/dt}$ then again discharges. The discharge current flows via $R_{shunt, Dcp1}$, $C_{dv/dt}$ and L. The voltage on node D is then the negative forward voltage of the diode $D_{cp2}$ exclusive of the voltage drop on resistor $R_{shunt}$.

The voltage on the connection from the capacitor $C_{dv/dt}$ to the diode D and the coil L then oscillates around the value of the input voltage. More particularly, when the input voltage is smaller than half the output voltage, the voltage on the capacitor $C_{dv/dt}$ oscillates to zero. The oscillation process is continued until the switch S is turned on again. The processes in the charge pump then again correspond to the processes when the switching transistor S is turned off.

In the present circuit there is a substantially square-shaped voltage on node D, whose value is in essence equal to the supply voltage plus a forward voltage of the diode applied to the control unit 6 when the voltage on the switching transistor S rises or the diode D is conductive, and which is, in essence, equal to a negative forward voltage of the diode when the voltage on the switching transistor S drops or is zero.

This square-wave voltage is applied via the resistor $R_{clip}$ to the cathodes of the two diodes $D_{clip}$ and $D_{ZVZCS}$, which leads to the fact that the terminal on the $R_{ZVS1}$ side of the capacitor $C_{ZVS}$ is charged to the value $V_{supply}$ when the voltage on node D has the upper value.

The voltage divider comprising the resistors $R_{ZBS1}$ and $R_{ZVS2}$ and the transistor $T_{ZVS}$ now provide a maximum function for half the value of the voltage on $C_{ZVS}$ and for the voltage on the capacitor $C_T$, so that the controller IC cannot start a new switching cycle and turn on the switch S again until the two voltages have dropped below the value $\frac{1}{3}V_{supply}$.

The value of $C_{ZVS}$ together with the values for $R_{ZVS1}$ and $R_{ZVS2}$ is selected so that after the change of the voltage on node D from the upper to the lower value, still half the period duration elapses that appears from a respective oscillation or resonant frequency coming from the resonant circuit elements L and $C_{dv/dt}$. At this instant the voltage $V_T$ has either the value zero (for the case where $U_{in}<U_{out}/T$), or drops to a minimum value.

The resistor $R_{restart}$ now prevents that in the event of high input voltages i.e. when the current in L takes a very long time to drop, that turning the switch S on again is delayed so much that there are switching frequencies in the audible range. Furthermore, this prevents that even if the detection of the turning-on again failed, the converter will stop its operation and not start again. Consequently, the time constant which is determined by $C_{dv/dt}$ and $R_{restart}$ is selected such that a minimum switching frequency of 20 kHz is not fallen short of.

When the converter 1 is being started, the capacitors $C_{buf1}$ and $C_{buf}$ are charged via the resistor $R_{boot}$. The converter is started when the minimum 12 volts start voltage of the control ICs 9 is reached. Then the resistors $R_{tonmax}$ and $R_{tonmin}$ support the starting process. Since these measures act in combination, the start time of 13 to 15 ms is achieved. Subsequently, the control IC 9 passes through a further soft starting phase which takes another 4 ms.

Furthermore, the converter having the described structure has rendered an additional power reserve available for mains or converter input voltages respectively that lie below the specified operating range. If the control unit 6 is in the state in which there is a turn-off control signal on the terminal Gate, because the turn-on condition (current in the diode D is zero, voltage on the capacitor $C_{dv/dt}$ is zero or minimal) has not yet been satisfied, but the voltage on the capacitor $C_T$ has already dropped to $\frac{1}{3}V_{supply}+V_F$, the capacitor $C_T$ is discharged further until the ZVS switching circuit again generates a turn-on signal on the terminal Gate. This occurs when the converter works with maximum power and a very small input voltage. This provides that the voltage on the capacitor $C_T$ is smaller than $\frac{1}{3}V_{supply}+V_F$ at the start of the next cycle. Accordingly, the time interval $t_{onmax}$ for the next cycle is longer than in normal operation. This leads to a momentary frequency drop and allows to briefly build up higher currents in the coil L than the dimensioning of the time-defining elements would actually allow. In this manner, a substantial increase of the maximum turn-on period $t_{onmax}$ may be achieved (about 20 to 30% in the present converter circuit), which leads to the said additional power reserve for small line voltages $U_{net}$.

Figure 3:
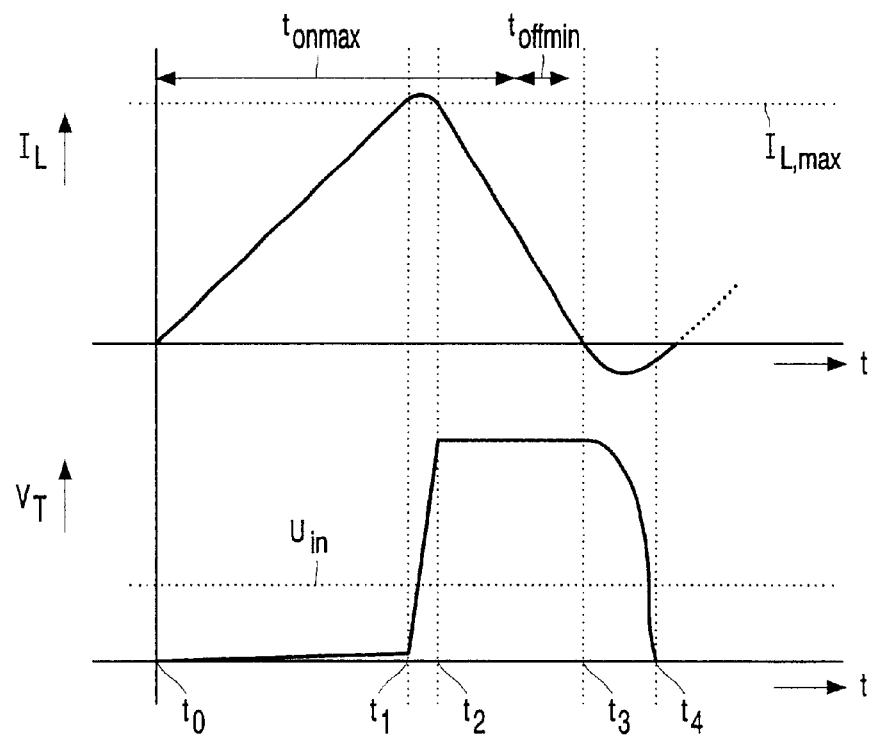
FIGS. 3 to 5 show time diagrams of a current flowing through the fly-back coils of the converter and a voltage $V_T$.

FIG. 3 shows the basic time diagrams of the current $I_L$ and the switching voltage $V_T$ that can be tapped from the node between the switch S, the inductance L and the diode D for the case of full load (maximum converter output power) and of a small input voltage in a first input voltage range (for example in the range around $U_{net}=110$ volts) are represented. At the instant to the switch S is turned on i.e. put in the conductive state. Until instant $t_1$ the current $I_L$ then linearly rises with the increase $dI_L/dt=U_{in}/L$ up to the value $I_{L,max}$, while the instant $t_1$ represents the instant at which the switch S is turned off. In the time space between $t_0$ and $t_1$ the voltage $V_T$ substantially keeps the zero value.

At the instant $t_1$ the switch S is turned off. This leads to a steep rise of the voltage $V_T$ having the slope $I_L(t=t_1)/C_{dv/dt}$, the upper limit of the slope being determined by the element properties of the switch S and the upper limit for the generation of electromagnetic disturbances. The value $U_{in}$ is then exceeded by the voltage $V_T$. The current $I_L$ driven along by the energy stored in the inductance L is diverted into the capacitor $C_{dv/dt}$ after the instant $t_1$.

At the instant $t_2$ the voltage on the capacitor $C_{dv/dt}$ has risen so far as to make the diode D conductive. This leads to a linear drop of the current $I_L$ until instant $t_3$ at which the diode D again adopts the blocking state. Between the instants $t_2$ and $t_3$ the switching voltage $V_T$ is constant and is equal to the voltage on capacitor $C_{outf}$.

At the instant $t_3$ an oscillation of the voltage $V_T$ sets in around the drawn-in instantaneous value of the voltage $U_{in}$; the resonant circuit elements determining this oscillation are the inductance L and the capacitor $C_{dv/dt}$. At the next zero-crossing of the voltage $V_T$, the switch S is again turned on and a new cycle with the events described above for the time space between to and $t_4$ begins. The switch S is turned on with a zero switch voltage $V_T$ i.e. a ZVS mode (Zero Voltage Switching) is ensured. Furthermore, turning on the switch S is effected with a current in the diode D of zero amperes (ZCS mode–Zero Current Switching). In consequence, high switching frequencies of the switch S are possible in the described mode of operation.

Furthermore, FIG. 3 shows two time intervals $t_{onmax}$ and $t_{offmin}$, where $t_{onmax}$ denotes the maximum time interval for which the switch S can be turned on within a cycle. $t_{offmin}$ denotes the minimum time interval in which the switch S must be turned off within a cycle. If from the beginning of a cycle (for example $t=t_0$) the time interval $t_{onmax}+t_{offmin}$ has elapsed, the earliest permissible instant is reached at which the switch S is allowed to be turned on again and a new cycle may be introduced. The switch S is then turned on as soon as the voltage $V_T$ has reached the next zero-crossing. The value $t_{onmax}$ follows the variation of the voltage $U_{in}$ and can be selected so large as to have the current $I_L$ still large enough with the smallest permissible value of $U_{in}$, to provide the maximum converter output power.

The converter is operated in critical fashion in the case according to FIG. 3. The switching frequency of the switch S depends, in essence, only on the input voltage and on the value of the inductance of the coil L and on the converter output power.

Figure 4:
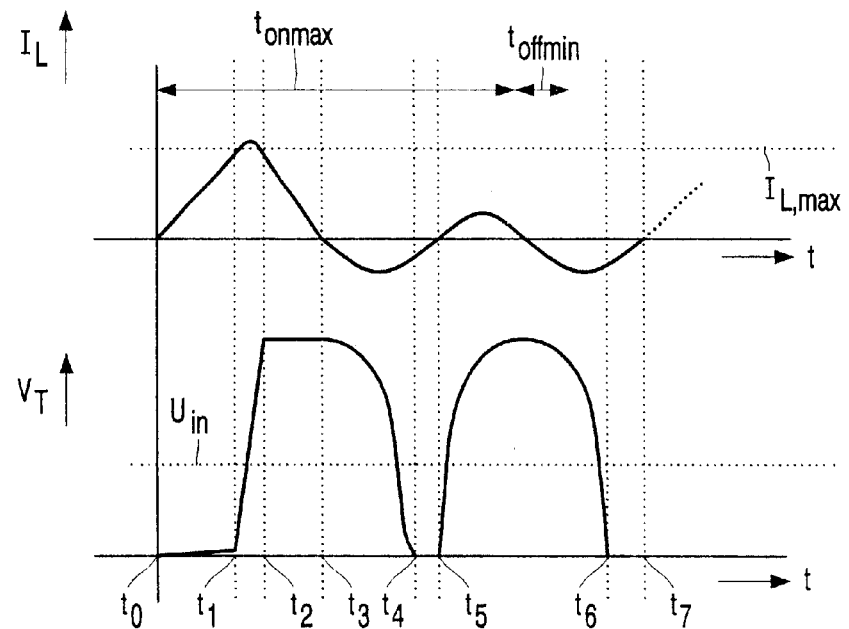

FIG. 4 shows the basic time diagrams of $I_L$ and $V_T$ for the case of a small input voltage (like in FIG. 3) and the case of partial load, in which the load present on the converter output is small (here about 10% of the nominal power). Contrary to the case represented in FIG. 3, the converter 1 works discontinuously. After the switch S has been turned off at instant $t_1$ and a next zero-crossing of the voltage $V_T$ has been reached at instant $t_4$, since the beginning of the cycle ($t=t_0$) not so much time as denoted by the sum $t_{onmax}+t_{offmin}$ has yet elapsed. Only when such a time space has elapsed can the switch S be turned on again. Since, accordingly, at instant $t_4$ the switch S has not yet been turned off, the oscillation of $V_T$ (activated oscillation circuit elements: L and $C_{dv/dt}$) started at instant $t_2$, is continued. $V_T$, however, cannot become negative here, because the switch S is arranged as a MOSFET transistor which even has an internal body diode (not shown) that blocks a dropping-off of the voltage $V_T$ to negative values, so that between the instants $t_4$ and $t_5$ the voltage $V_T$ is limited to the zero value. At the instant $t_5$ the current $I_L$ oscillating since the instant $t_3$, which current has shown a negative half-wave in the area between $t_3$ and $t_5$, begins to show a positive half-wave. At the instant $t_5$ begins a positive half-wave of the voltage $V_T$, which half-wave ends at the instant $t_6$ (at which the current $I_L$ just has a negative half-wave), after which again a time space begins having $V_T=0$. At the instant $t_6$ more time has elapsed since the beginning of the cycle (instant $t_0$) than denoted by the sum $t_{onmax}+t_{offmin}$, so that the condition for turning the switch S on again is satisfied. The switch is turned on, as described above, half a period duration after the current in D has become zero, thus about halfway between $t_6$ and $t_7$. In the waveforms this becomes only visible when the current in the coil L has turned positive again, thus at instant $t_7$. In this manner, a ZVS or ZCS mode can ideally be realized. The losses occurring in the switch S and in the diode D are reduced to a minimum. The resulting switching frequency depends on $t_{onmax}$ and $t_{offmin}$ in the application as shown in FIG. 4.

Figure 5:
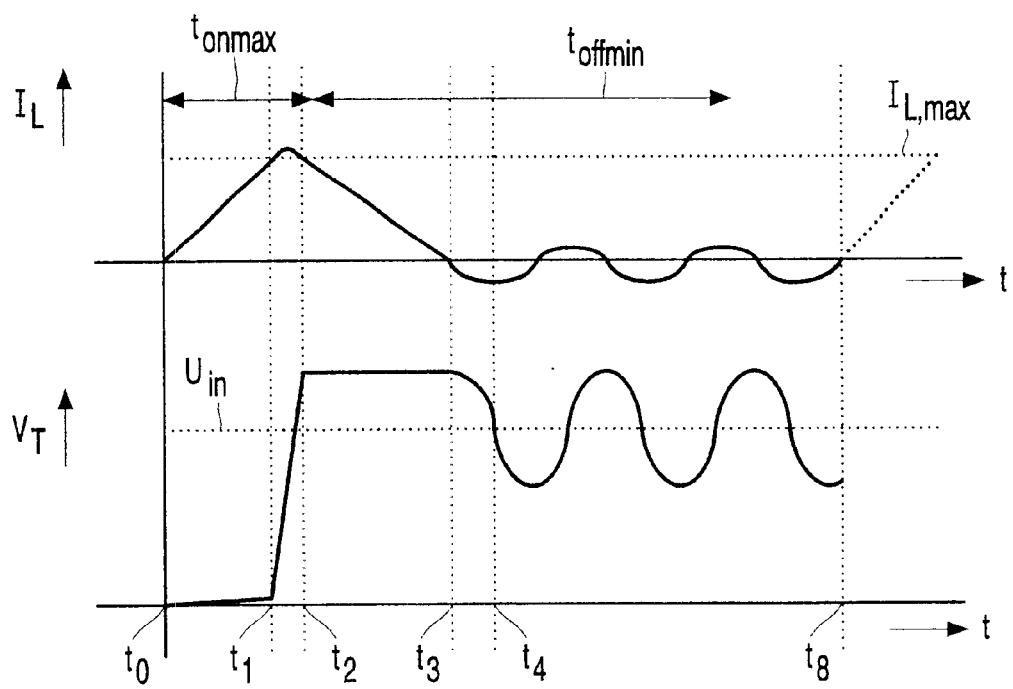

FIG. 5 shows the basic time diagrams of $I_L$ and $V_T$ for the case of high input voltages in a second input voltage range (for example, in the range of $U_{net}=230$ volts) for all cases of load (full load and partial load).

Just like the cases shown in FIGS. 3 and 4, oscillations of the current $I_L$ and of the voltage $V_T$ occur from an instant $t_3$ onwards. The voltage $V_T$ again oscillates around the voltage $U_{in}$, which adopts an accordingly larger value based on the higher converter input voltage $U_{net}$, so that $V_T$ no longer drops to the zero value. For minimizing the switching losses, the end of a switching cycle $t_8$ and thus the turning-on again of the switch S is put in the next successive minimum of the voltage $V_T$ after the time $t_{onmax}+t_{offmin}$ elapsed since the beginning of the cycle to.

In contrast to customary converters with a fly-back circuit structure in which, with a reduced converter input voltage, the critical operation is maintained (which leads to higher switching frequencies and a reduced maximum value of the current $I_L$ that lies far below the saturation current $I_{L,sat}$), it is permitted with the converter according to the invention that during the phases in which the current $I_L$ rises, the switch S is turned on up to the saturation current $I_{I,sat}$ representing the upper limit for the current $I_L$. The converter in this arrangement works discontinuously, so that a switching frequency reduction is effected.

The converter according to the invention provides a so-called power factor correction. The selected control principle to turn off the switch S when a current is reached, which current is determined by a regulator included in the control unit leads—considered per se—to a square-wave pattern of the input current $I_{net}$. This enables to realize powers up to several hundred watts without exceeding the permitted limits for the relative harmonic factor of the line current.

In the described converter, determining a minimum switching frequency together with the selected control principle additionally provides that the waveform of the line input current $I_{net}$ is no longer square-shaped, but trapezoidal with rounded-off transitions. As a result, the harmonic content of the input current $I_{net}$ is further reduced and much better performance in agreement with the respective line current regulations may be achieved.

What is claimed is:

1. A method of operating a fly-back converter which comprises: operating the fly-back converter in a first fly-back switching frequency range when the operating converter input voltage lies in a first voltage range, and when the converter input voltage lies in a second voltage range, operating the fly-back converter in a second fly-back switching frequency range, the first voltage range having lower voltage values than the second voltage range and the first fly-back switching frequency range having higher frequency values than the second fly-back switching frequency range.

2. The method as claimed in claim 1, wherein the converter includes an inductor and is operated discontinuously in the second voltage range and with approximately the same upper limit for the inductor current both during operation in the first voltage range and during operation in the second voltage range.

3. The method as claimed in claim 2, wherein the converter operates in a boundary region between continuous and discontinuous operation in the first voltage range and under full load, wherein the converter operates discontinuously in the first voltage range and under partial load, and the converter operates discontinuously in the second voltage range both under full load and under partial load.

4. The method as claimed in claim 1, wherein the converter operates in a boundary region between continuous and discontinuous operation in the first voltage range and under full load, in that the converter operates discontinuously in the first voltage range and under partial load, and in that the converter operates discontinuously in the second voltage range both under full load and under partial load.

5. A method as claimed in claim 1, wherein a transition from the first to the second mode of operation takes place continuously.

6. A fly-back converter comprising:
   input terminals for connection to a source of AC supply voltage for the converter,
   rectifying means coupled to the input terminals for producing a DC supply voltage,
   a fly-back inductance, a fly-back switching element and a fly-back diode coupled to an output of the rectifying means and coupled together as a fly-back converter for operation from the DC supply voltage,
   load output terminal's coupled to the fly-back converter so as to receive a DC output voltage, and
   a control circuit having input means coupled to the fly-back converter and an output coupled to a control terminal of the fly-back switching element so as to control the operation thereof such that, when the AC supply voltage lies in a first low voltage range, the fly-back switching element is operated in a first switching frequency range, and when the AC supply voltage lies in a second higher voltage range, the fly-back switching element is operated in a second switching frequency range, wherein the first switching frequency range is higher than the second switching frequency range.

7. A fly-back converter as claimed in claim 6, further comprising a first capacitor connected so as to provide the supply voltage for the control circuit which in turn supplies a control signal for the fly-back switching element, wherein the first capacitor is coupled to a node between the fly-back inductance, the fly-back switching element and the fly-back diode via a second capacitor and a further diode via which the first capacitor is charged in the manner of a charge pump.

8. A fly-back converter as claimed in claim 6, further comprising means connected to the node between the fly-back inductance, the fly-back switching element and the fly-back diode for deriving a control signal for the control circuit and based upon the zero state of the current flowing through the fly-back diode and/or of the state of minimum voltage on the fly-back switching element.

9. The fly-back converter as claimed in claim 6 wherein the control circuit input means receives control voltages from the converter whereby the control circuit switches the fly-back switching element on and off such that, under full load and with the AC supply voltage in the first voltage range, the converter operates in a boundary range between continuous and discontinuous operation, and under partial load and with the AC supply voltage in the first voltage range, the converter operates discontinuously, and wherein the converter operates discontinuously in the second voltage range both under full load and under partial load.

10. The fly-back converter as claimed in claim 6 wherein the control circuit input means receives control voltages from the converter whereby the control circuit switches the fly-back switching element on and off such that, the converter is operated in the discontinuous mode with the AC supply voltage in the second voltage range and with approximately the same upper limit for the fly-back inductance current during converter operation in both the first voltage range and the second voltage range.

11. The fly-back converter as claimed in claim 6 further comprising a first capacitor coupled via a second capacitor and a second diode to a circuit node between the fly-back inductance, the fly-back switching element and the fly-back diode, and
   means for coupling a voltage developed on the first capacitor to a supply voltage input of the control circuit.

12. The fly-back converter as claimed in claim 6 further comprising means for deriving first and second control voltages based upon a zero current flow through the fly-back diode and a minimal voltage across the fly-back switching element, respectively, and
   means for coupling the first and second control voltages to the input means of the control circuit whereby the control circuit turns on the fly-back switching element in at least one of a ZVS and ZCS mode of operation.

13. The fly-back converter as claimed in claim 6 wherein the control circuit input means receives a first control voltage proportional to the AC supply voltage and a second control voltage determined by an output voltage produced at a load output terminal, whereby the control circuit is controlled at least in part by said first and second control voltages.

14. The fly-back converter as claimed in claim 13 wherein the control circuit input means receives a third control voltage derived from the output voltage at the load output terminal via a parallel circuit including resistance means and capacitance means, the control circuit being controlled at least partly by said third control voltage.

15. The fly-back converter as claimed in claim 14 wherein said parallel circuit comprises a first branch including a first series circuit of a first capacitor and a first resistor, a second branch including a second resistor, and a third branch including a second capacitor.

16. The fly-back converter as claimed in claim 14 wherein the control circuit input means receives fourth and fifth control voltages based upon a zero current flow through the fly-back diode and a minimum voltage across the fly-back switching element, respectively, whereby the control circuit turns on the fly-back switching element in at least one of a ZVS and ZCS mode of operation.

17. The fly-back converter as claimed in claim 16 further comprising a first capacitor coupled to a circuit node between the fly-back inductance, the fly-back switching element and the fly-back diode via a second capacitor and a second diode, and
   means for coupling a voltage developed on the first capacitor to a supply voltage input of the control circuit.

18. The fly-back converter as claimed in claim 6 wherein said fly-back inductance and said fly-back diode are connected in series between a first output terminal of the rectifying means and a first load output terminal,
   said fly-back switching element being coupled to a circuit node between the fly-back inductance and the fly-back diode and to a second output terminal of the rectifying means, a first capacitor coupled to said circuit node via a series circuit of a second capacitor and a second diode, and means for coupling a voltage developed on the first capacitor to a supply voltage input of the control circuit.

19. The fly-back converter as claimed in claim 18 further comprising an output capacitor coupled across the load output terminals and a current limiting element coupled between the fly-back diode and the first load output terminal.

20. The fly-back converter as claimed in claim 19 further comprising a third diode coupled between a second circuit node between the second diode and the second capacitor and a first main terminal of the fly-back switching element, and wherein the fly-back inductance and the second capacitor together form an oscillation circuit.

* * * * *